(12) United States Patent
Mori

(10) Patent No.: US 9,751,479 B2
(45) Date of Patent: Sep. 5, 2017

(54) VEHICLE BUMPER REINFORCEMENT STRUCTURE

(71) Applicant: TOYOTA JIDOSHA KABUSHIKI KAISHA, Toyota-shi, Aichi-ken (JP)

(72) Inventor: Takeo Mori, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/050,774

(22) Filed: Feb. 23, 2016

(65) Prior Publication Data

US 2016/0244013 A1 Aug. 25, 2016

(30) Foreign Application Priority Data

Feb. 24, 2015 (JP) ................. 2015-033925

(51) Int. Cl.
*B60R 19/44* (2006.01)
*B60R 19/18* (2006.01)
*B60R 19/04* (2006.01)

(52) U.S. Cl.
CPC .............. *B60R 19/18* (2013.01); *B60R 19/04* (2013.01); *B60R 2019/182* (2013.01); *B60R 2019/1893* (2013.01)

(58) Field of Classification Search
CPC ... B60R 19/18; B60R 19/04; B60R 2019/182; B60R 2019/1893
See application file for complete search history.

(56) References Cited

U.S. PATENT DOCUMENTS 5,545,022 A    8/1996  Rosasco

FOREIGN PATENT DOCUMENTS

| JP | H04-143014 A | 5/1992 | |
| JP | 2001-322517 A | 11/2001 | |
| JP | 2004-203066 A | 7/2004 | |
| JP | 2006-036082 A | 2/2006 | |
| JP | 2007-502932 | 6/2007 | |
| JP | DE-102009042347 B4 * | 1/2014 | ........... B60R 19/023 |
| KR | 101402020 B1 * | 5/2014 | |

* cited by examiner

*Primary Examiner* — Lori L Lyjak
(74) *Attorney, Agent, or Firm* — Andrews Kurth Kenyon LLP

(57) ABSTRACT

A vehicle bumper reinforcement structure to increase energy absorption capacity is provided. The vehicle bumper reinforcement structure comprises a base member extending in the width direction of the vehicle that is attached to the vehicle at both width ends, and a first reinforcement member and a second reinforcement member attached to the base member at a width center of the vehicle. Widths of the reinforcement members are differentiated in such a manner to cause fracture of the base member at width ends of the reinforcement members by a predetermined collision impact applied to the width center of the base member.

5 Claims, 4 Drawing Sheets

VEHICLE BUMPER REINFORCEMENT STRUCTURE

The present invention claims the benefit of Japanese Patent Application No. 2015-033925 filed on Feb. 24, 2015 with the Japanese Patent Office, the disclosures of which are incorporated herein by reference in its entirety.

BACKGROUND

Field of the Invention

Embodiments of the present invention relates to the art of a reinforcement structure for a vehicle bumper that is deformed to absorb collision energy of a vehicle colliding with an obstacle.

Discussion of the Related Art

JP-A-2001-322517 describes a bumper beam comprising a base member attached to the front or rear of an automobile, and a reinforcement member having high compressive stiffness attached to the base member. The bumper beam taught by JP-A-2001-322517 can absorb low-speed impact without permanent deformation, and the base member and the reinforcement member are designed to be deformed by relatively high speed impact to absorb collision energy.

JP-A-2004-203066 describes a vehicle bumper assembly in which an upper wall and a lower wall of a bumper reinforce is prevented from being damaged to reduce displacement of the bumper reinforce. To this end, according to the teachings of JP-A-2004-203066, a reinforcement member having a hollow space is fitted onto a front wall of the bumper reinforce as a rectangular pipe in such a manner to cover the upper and lower walls.

JP-A-H04-143014 describes a reinforcement steel tube for vehicle body. According to the teachings of JP-A-H04-143014 a short cylindrical cover member is fitted onto a width center of the reinforcement steel tube so that the steel tube is bent at both ends of the cylindrical cover to prevent a local deformation toward a vehicle interior.

Bending strength of the bumper at width center can be enhanced by the reinforcement members taught by the above-mentioned prior art documents and hence the kinetic energy generated by an impact applied to the width center of the bumper can be dissipated to supporting members at width ends of the bumper. That is, larger energy can be absorbed by the bumper thus reinforced.

An absorption capacity of the bumper of this kind is governed by a product of a deformation and a reaction of the bumper. In order to enhance the absorption capacity of the bumper, therefore, it is preferable to enhance deformability of the bumper in addition to enhance bending strength. For example, deformability of the bumper may be enhanced by arranging a plurality of reinforcement members on the bumper to increase a number of bend points at both width ends of each reinforcement member where the bumper is fractured by the collision impact. However, once the bumper is fractured at some of the bend point(s), reaction of the bumper is no longer established and hence the bumper may not be fractured at the other bend points as intended. For this reason, absorption capacity of the bumper may not be enhanced as desired.

SUMMARY

Aspects of an embodiment of the present invention have been conceived noting the foregoing technical problems, and it is therefore an object of embodiments of the present invention is to enhance an absorption capacity of a vehicle bumper to absorb collision impact to the width center of a vehicle.

The vehicle bumper reinforcement structure according to the preferred example for a vehicle is attached to a front side of a vehicle while extending in a width direction of the vehicle to be deformed by a collision impact to absorb collision energy. In order to achieve the above-explained objective, according to the preferred example, the vehicle bumper reinforcement structure is provided with a base member extending in the width direction of the vehicle that is attached to the vehicle at both width ends, and a first reinforcement member and a second reinforcement member respectively attached to the base member at a width center of the vehicle. In addition, widths of the first reinforcement member and the second reinforcement member are differentiated in such a manner to cause fracture of the base member at width ends of the first reinforcement member and at width ends of the second reinforcement member by a predetermined collision impact applied to the width center of the base member.

Specifically, the widths of the first reinforcement member and the second reinforcement member may be individually determined based on a bending moment applied to each width end of the reinforcement member by the collision impact to the width center of the base member, and a maximum allowable bending moment of the reinforcement member.

More specifically, the widths of the first reinforcement member and the second reinforcement member may be determined in such a manner to increase the maximum allowable bending moment of the base member stepwise from the width end of the base member to the width end of the second reinforcement member and from the width end of the base member to the width end of the first reinforcement member at a same increasing rate.

According to the preferred example, the first reinforcement member may be attached to any of a front wall and a rear wall of the base member symmetrically across the width center of the vehicle, and the second reinforcement member may be attached to the other front wall or rear wall of the base member symmetrically across the width center of the vehicle.

The vehicle bumper reinforcement structure is further provided with a pair of side members extending from the width ends of the vehicle, and the base member may be connected to the vehicle through the side members at width ends.

Thus, according to the preferred example of the present invention, the first reinforcement member and the second reinforcement member are respectively attached to the base member connected to the vehicle at width ends. In addition, widths of the first reinforcement member and the second reinforcement member are differentiated in such a manner to cause fracture of the base member at width ends of the first reinforcement member and at width ends of the second reinforcement member by a predetermined collision impact applied to the width center of the base member. According to the preferred example, therefore, a number of fracture points of the base member is increased so that energy absorption capacity of the vehicle bumper can be increased.

BRIEF DESCRIPTION OF THE DRAWINGS

Features, aspects, and advantages of exemplary embodiments of the present invention will become better under

DETAILED DESCRIPTION OF THE PREFERRED EMBODIMENT(S)

Figure 6:
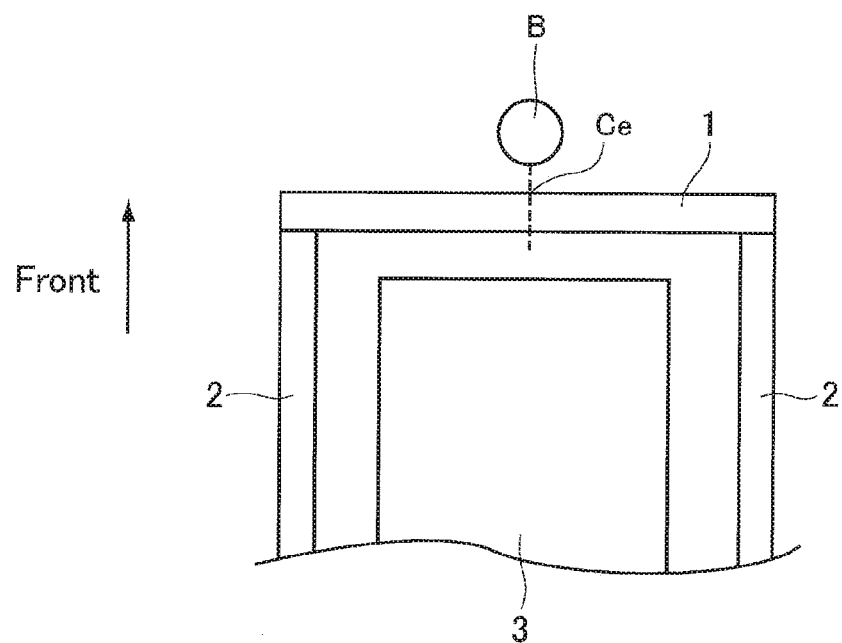
FIG. 6 is a schematic illustration showing an example of installation of the bumper assembly to the vehicle.

The bumper reinforcement structure is attached to the front or rear of a vehicle at both width ends, and adapted to be deformed inwardly by a collision impact to absorb kinetic energy. Referring now to FIG. 6, there is shown one example of a bumper assembly 1 attached to the front side of the vehicle. In FIG. 6, a pole barrier B is erected in front of the width center of the vehicle.

In the example shown in FIG. 6, the bumper assembly 1 is connected to a front side of a frame of the vehicle at both width ends through a pair of side members 2. That is, a collision impact to the bumper assembly 1 propagates to the frame via the side members 2. As known in the conventional art, the frame is comprised of a plurality of members to dissipate the kinetic energy generated by collision impact. The side member 2 is formed of metal material having high rigidity, and shaped to have a cross-sectional shape possible to enhance buckling strength.

Each width end of the bumper assembly 1 is attached individually to a leading end of the side member 2 by a bolt (not shown) so that a width center Ce of the bumper assembly 1 is deformed inwardly by a collision impact to absorb collision energy. Optionally, a conventional crush box (not shown) may be interposed between the leading end of the sider member 2 and the bumper assembly 1 to absorb kinetic energy generated by collision impact. Alternatively, a weakened portion may be formed in the leading end of the side member 2 instead of the crush box. In addition, a not shown ornamental bumper member is attached to the front side of the bumper assembly 1. As illustrated in FIG. 6, an engine room 3 is formed on the rear side of the bumper assembly 1, and an engine and a powertrain including a transmission and so on are arranged in the engine room 3.

Figure 1:
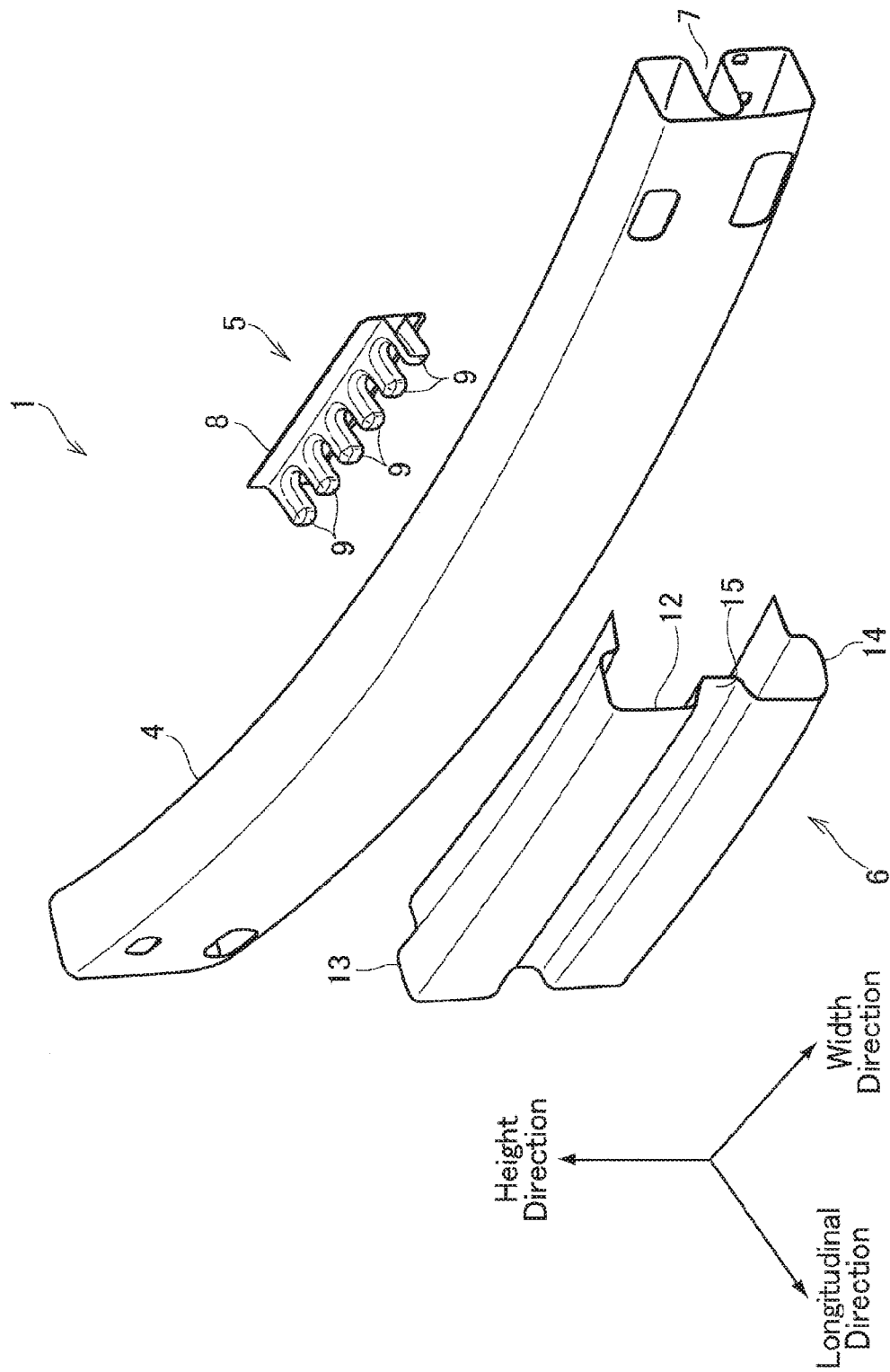
- FIG. 1 is a perspective view showing one example of the bumper assembly according to the preferred example.

Here will be explained a structure of the bumper assembly 1 in more detail with reference to FIG. 1. As illustrated in FIG. 1, the bumper assembly 1 comprises a base member 4 connected to the side members 2 at its width ends, an inner bracket 5 attached to a back face of the base member 4 (facing to the engine room 3) at the width center Ce, and an outer plate 6 fitted onto the front face of the bumper assembly 1 at the width center Ce. Accordingly, the inner bracket 5 serves as the claimed first reinforcement member and the outer plate 6 serves as the claimed second reinforcement member to enhance bending strength of the bumper assembly 1. Here, the bending strength of the bumper assembly 1 can be calculated by dividing a maximum bending moment to cause fracture of the bumper assembly 1 by a cross-sectional coefficient of the bumper assembly 1.

The base member 4 is formed by a roll-forming method using a metal sheet having a constant thickness. Specifically, in order to trim weight of the bumper assembly 1, the base member 4 is shaped into a hollow structure such as an arcuate rectangular pipe. In addition, in order to prevent a deformation of the base member 4 by a relatively small impact, a height center of a rear wall of the base member 4 facing to the vehicle body is depressed to form a laterally extending first bead 7. According to the preferred example, therefore, bending strength of the base member is constant in widthwise.

Figure 2:
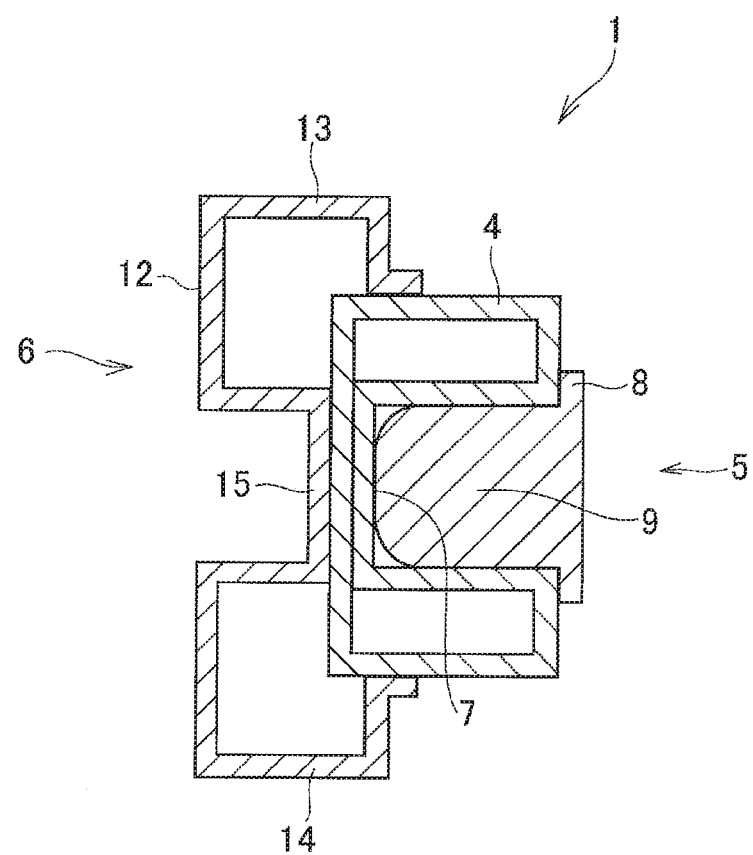
FIG. 2 is a cross-sectional view showing a cross-section of the bumper assembly in which an inner bracket and an outer plate are attached to the base member.

Turning to FIG. 2, there is shown a cross-section of the bumper assembly 1 in which the inner bracket 5 and the outer plate 6 are attached to the base member 4. As illustrated in FIG. 1, the inner bracket 5 comprises a base plate 8 and a plurality of protrusions 9 at predetermined intervals. The protrusions 9 of the inner bracket 5 are inserted into the first bead 7 of the base member 4, and the base plate 8 of the inner bracket 5 is fixed to a back face of the base member 4 by a bolt or welding method. That is, a length of each of the protrusions 9 of the inner bracket 5 is substantially identical to a depth of the first bead 7 of the base member 4, and the inner bracket 5 is inserted into the first bead 7 symmetrically across the width center Ce.

Figure 3:
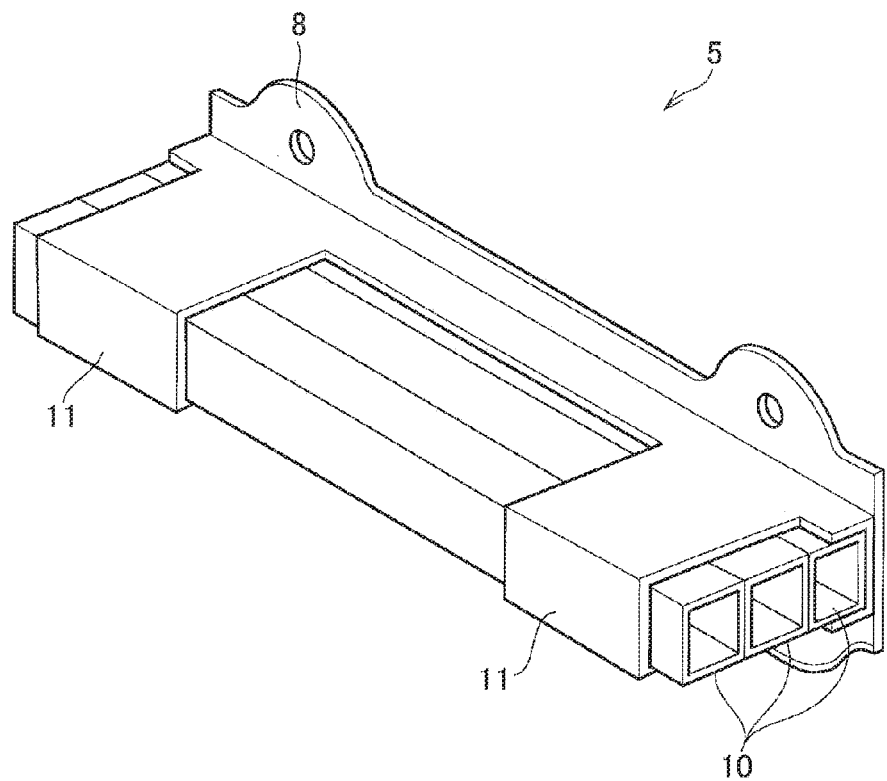
FIG. 3 is a perspective view showing another example of the inner bracket.

Thus, the bending strength of the base member 4 is enhanced at the width center Ce by the inner bracket 5. To this end, material, configuration, bending strength etc. of the inner bracket 5 may be altered arbitrarily according to need. Turning now to FIG. 3, there is shown another example of the inner bracket 5. According to the example shown in FIG. 3, the inner bracket 5 is formed of three rectangular aluminum pipes 10 individually formed by an extrusion method, the base plate 8 made of resin by an injection method, and a holder 11 integrated with the base plate 8 to bundle the aluminum pipes 10. The holder 11 thus holding the aluminum pipes 10 is inserted into the first bead 7, and the base plate is fixed to the back face of the base member 4 by a bolt.

Turning back to FIG. 1, the above-explained outer plate 6 is fitted onto the front face of the base member 4 in a symmetrical manner across the width center Ce. This means that the bending strength of the outer plate 6 is homogeneous in both sides of the width center Ce. In addition, a length of the outer plate 6 in the width direction of the vehicle is longer than that of the inner bracket 5. Specifically, the outer plate 6 comprises a front wall 12 covering the front wall of the base member 4, an upper wall 13 formed by bending an upper portion of the front wall 12 toward the vehicle body, and a lower wall 14 formed by bending a lower portion of the front wall 12 toward the vehicle body. A leading end of the upper wall 13 is bent into L-shape to be fixed to the upper wall of the base member 4, and a leading of the lower wall 14 is also bent into L-shape to be fixed to the lower wall of the base member 4. In order to enhance bending strength of the outer plate 6, a height center of a front wall of the outer plate 6 is depressed toward the base member 4 to form a laterally extending second bead 15, and a bottom wall of the second bead 15 is brought into contact to the front wall of the base member 4. For example, the outer plate 6 thus structured may be formed by a press method and a roll method.

Figure 4:
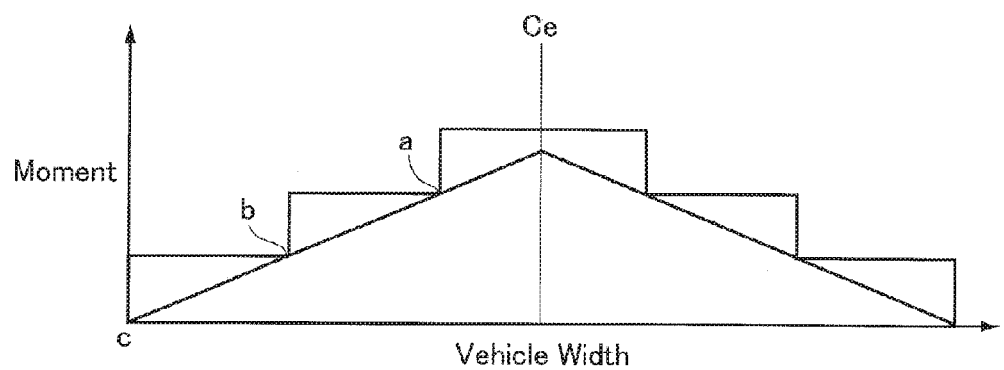
FIG. 4 is a graph indicating bending moment acting on the bumper assembly shown in FIG. 1.

The bending moment applied to the bumper assembly 1 by a maximum collision impact to the width center Ce is indicated in FIG. 4. In FIG. 4, the horizontal axis represents the width of the vehicle, and the vertical axis represents a magnitude of the bending moment. In FIG. 4, in addition, the maximum allowable bending moment at each point of the bumper assembly 1 is also indicated.

As described, the bending strength of the base member 4 is homogeneous entirely widthwise. The outer plate 6 the bending strength thereof is also homogeneous entirely widthwise is attached to the front wall of the base member 4 in a symmetrical manner across the width center Ce so that the bending strength of the outer plate 6 is added to the base member 4 equally on both sides of the width center Ce. In addition, the inner bracket 5 the bending strength thereof is also homogeneous entirely widthwise is attached to the rear wall of the base member 4 in a symmetrical manner across the width center Ce so that the bending strength of the inner bracket 5 is further added to the base member 4 equally on both sides of the width center Ce. Since each of the base member 4, the inner bracket 5 and the outer plate 6 is individually formed into the symmetrical shape, a section modulus of the bumper assembly 1 at the intermediate portion where the inner bracket 5 and the outer plate 6 are attached to the base member 4 is entirely homogeneous widthwise. As indicated in FIG. 4, therefore, the maximum allowable bending moment of the bumper assembly 1 is increased stepwise toward the intermediate portion at which the bending strength thereof is enhanced by the inner bracket 5 and the outer plate 6. Here it is to be noted that only the left part of the bumper assembly 1 will be explained for the sake of convenience. In FIG. 4, specifically, "c" represents a width end point of the base member 4, "b" represents a width end point of the outer plate 6, and "a" represents a width end of the inner bracket 5. As can be seen from FIG. 4, the maximum allowable bending moment is increased stepwise at the points "b" and "a".

When the collision impact is applied to the bumper assembly 1 at the width center Ce, the bumper assembly 1 is subjected to the bending moment between the width end points "c". The bending moment at each point of the bumper assembly 1 can be calculated by multiplying a distance from the width end point "c" by a load applied to the width center Ce. That is, the bending moment acting on the bumper assembly 1 is increased proportionally from the width end point "c" toward the width center Ce.

Specifically, the bumper assembly 1 is bent at a point where the bending moment acting thereon exceeds the maximum allowable bending moment. As shown in FIG. 4, when the collision impact is applied to the width center Ce of the bumper assembly 1, the bumper assembly 1 will be subjected to the bending moment greater than the maximum allowable bending moment thereof at the point "a" and the point "b", but the bending moment applied to the point "c" will not exceed the maximum allowable bending moment. That is, when the collision impact is applied to the bumper assembly 1 at the width center Ce, the bumper assembly is fractured at the point "a" and the point "b".

That is, the most significant collision impact is applied to the width center Ce of the bumper assembly 1 and hence the width center Ce is subjected to the bending moment most significantly. Such bending moment is lightened proportionally toward the both width end points "c". In FIG. 4, specifically, the slopes extending downwardly on both sides of the width center Ce get steeper with an increase in the collision impact applied to the width center Ce. As described, the bumper assembly 1 is fractured at the width end points "a" of the inner bracket 5 shown in FIG. 4 and at the width end points "b" of the outer plate 6 shown in FIG. 4 by the collision impact to the width center Ce. According to the preferred example, widths of the inner bracket 5 and the outer plate 6 are determined to cause fracture at the width end points "a" and "b" by a target maximum collision impact to the width center Ce at a peak of the slope representing the bending moment in FIG. 4. Specifically, as indicated in FIG. 4, the widths of the inner bracket 5 and the outer plate 6 are determined in such a manner to increase the maximum allowable bending moment of the bumper assembly 1 stepwise from the width end point "c" to the width end point and "b" and from the width end point "c" to the width end point and "a" at a same increasing rate. In other words, an inclination of the slope indicating the maximum bending moment of the bumper assembly 1 is identical between the points "c" and "b" and between the points "c" and "a".

Figure 5:
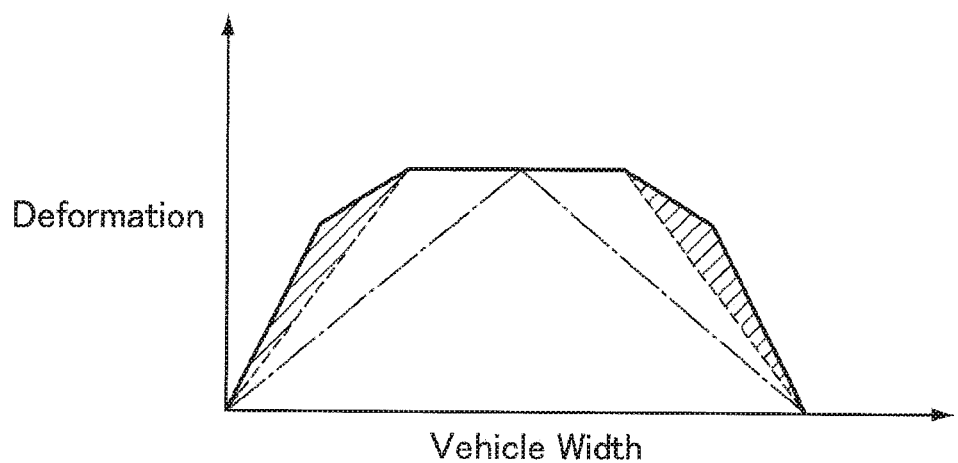
FIG. 5 is a graph indicating energy absorption of the bumper assembly shown in FIG. 1.

Thus, according to the preferred example, the bumper assembly 1 is fractured by the target maximum collision impact to the width center Ce at the width end points "a" and "b". Energy absorption of the bumper assembly in this situation is schematically indicated in FIG. 5. In FIG. 5, the vertical axis represents deformation of the bumper assembly toward the vehicle body, the horizontal axis represents the width of the vehicle, the solid polygonal line represents a situation in which the bumper assembly 1 is fractured at both width end points "a" and "b" of the inner bracket 5 and the outer plate 6, the dashed lines represent a situation in which the bumper assembly 1 is fractured only at the width end points "a" of the inner bracket 5, and the dashed-dotted line represents a situation in which the bumper assembly 1 is fractured at the width center Ce. Specifically, energy absorption of the bumper assembly 1 can be calculated by multiplying the deformation of the fractured point by the reaction itself. That is, given that the reaction of the bumper assembly 1 is constant, the energy absorption of the bumper assembly 1 can be increased by increasing an area in FIG. 5 enclosed by any of the above-mentioned lines and the horizontal axis. As indicated in FIG. 5, the energy absorption capacity of the bumper assembly 1 is increased when fractured at both width end points "a" and "b" of the inner bracket 5 and the outer plate 6 in the amount of hatched area, in comparison with that of the case in which the bumper assembly 1 is fractured only at the width end points "a" of the inner bracket 5.

According to the preferred example, the energy absorption capacity of the bumper assembly 1 can be increased by thus attaching the inner bracket 5 and the outer plate 6 to the base member 4 having the above-explained widths.

Specifically, both of the inner bracket 5 and the outer plate 6 are attached to the base member 4 symmetrically across the width center Ce of the vehicle to increase the energy absorption capacity of the bumper assembly 1 as well as to prevent fracture of the bumper assembly 1 at the width center Ce. That is, the bending strength of the bumper assembly 1 can be increased without increasing the bending strength of the base member 4. For this reason, a smaller base member 4 can be employed to downsize the bumper assembly 1.

It is to be understood that various modifications may made in the bumper assembly within the spirit of the present invention. For example, more than three reinforcement members may be attached to the base member 4 while adjusting widths and bending strength thereof in the above-explained manner. In addition, configurations of the inner bracket 5 and the outer plate 6 may be altered according to need. For example, the inner bracket 5 may also be formed longer than the outer plate 6 widthwise. Further, the bracket 5 may be attached to the front wall of the base member 4 while attaching the plate 6 to the rear wall of the base member 4.

What is claimed is:

1. A vehicle bumper reinforcement structure for a vehicle attached to a front side of the vehicle and extending in a width direction of the vehicle to be deformed by a collision impact to absorb collision energy, comprising:
- a base member extending in the width direction of the vehicle that is attached to the vehicle at both width ends;
- a first reinforcement member and a second reinforcement member respectively attached to the base member at a width center of the vehicle; and
- a bead formed by depressing a rear wall of the base member towards the front side of the vehicle,
- wherein widths of the first reinforcement member and the second reinforcement member are differentiated in such a manner as to cause fracture of the base member at width ends of the first reinforcement member and at width ends of the second reinforcement member by a predetermined collision impact applied to the width center of the base member,
- wherein the base member is shaped into a hollow structure,
- wherein at least one of the first reinforcement member and the second reinforcement member is attached to the rear wall of the base member, and
- wherein at least one of the first reinforcement member and the second reinforcement member has a protrusion inserted into the bead.

2. The vehicle bumper reinforcement structure as claimed in claim 1, wherein the widths of the first reinforcement member and the second reinforcement member are individually determined based on a bending moment applied to each width end of the reinforcement member by the collision impact to the width center of the base member, and a maximum allowable bending moment of the reinforcement member.

3. The vehicle bumper reinforcement structure as claimed in claim 1, wherein the widths of the first reinforcement member and the second reinforcement member are determined in such a manner to increase the maximum allowable bending moment of the base member stepwise from the width end of the base member to the width end of the second reinforcement member and from the width end of the base member to the width end of the first reinforcement member at a same increasing rate.

4. The vehicle bumper reinforcement structure as claimed in claim 1,
- wherein the first reinforcement member is attached to any of a front wall and a rear wall of the base member symmetrically across the width center of the vehicle, and
- wherein the second reinforcement member is attached to the other front wall or rear wall of the base member symmetrically across the width center of the vehicle.

5. The vehicle bumper reinforcement structure as claimed in claim 1, further comprising:
- a pair of side members extending from the width ends of the vehicle; and
- wherein the base member is connected to the vehicle through the side members at width ends.

* * * * *